March 31, 1931.  S. GORDON  1,798,254
DRY ICE DISPENSER
Filed May 14, 1929   2 Sheets-Sheet 1
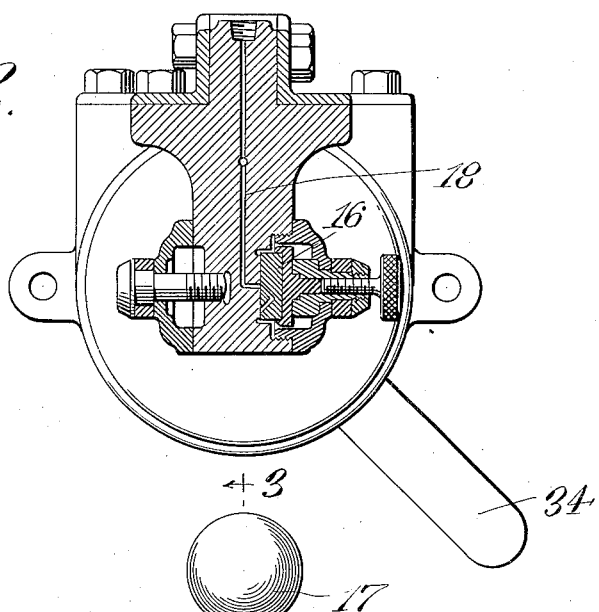
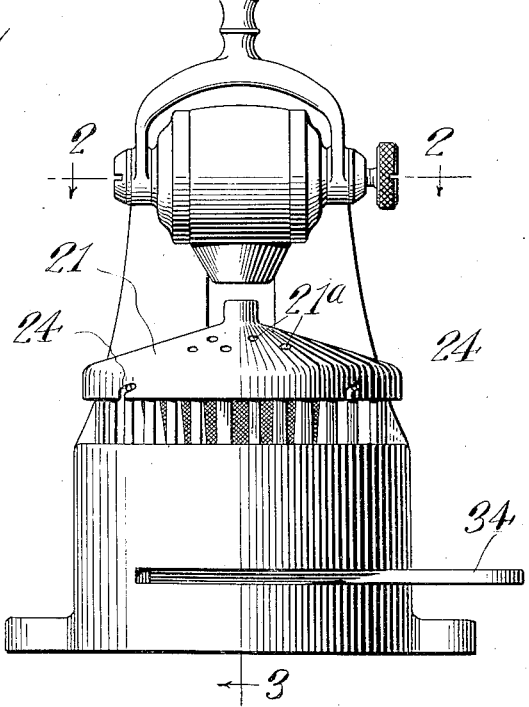
INVENTOR
Samuel Gordon
BY Townsend & Decker
ATTORNEYS March 31, 1931.   S. GORDON   1,798,254
DRY ICE DISPENSER
Filed May 14, 1929    2 Sheets-Sheet 2
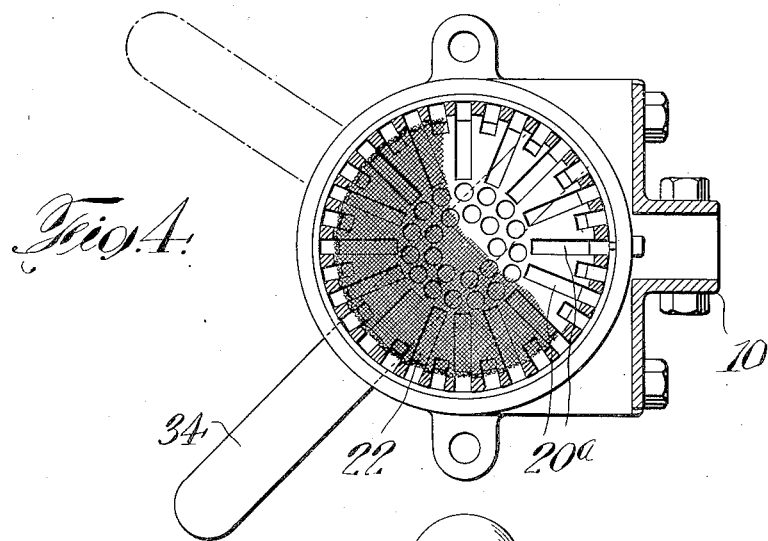
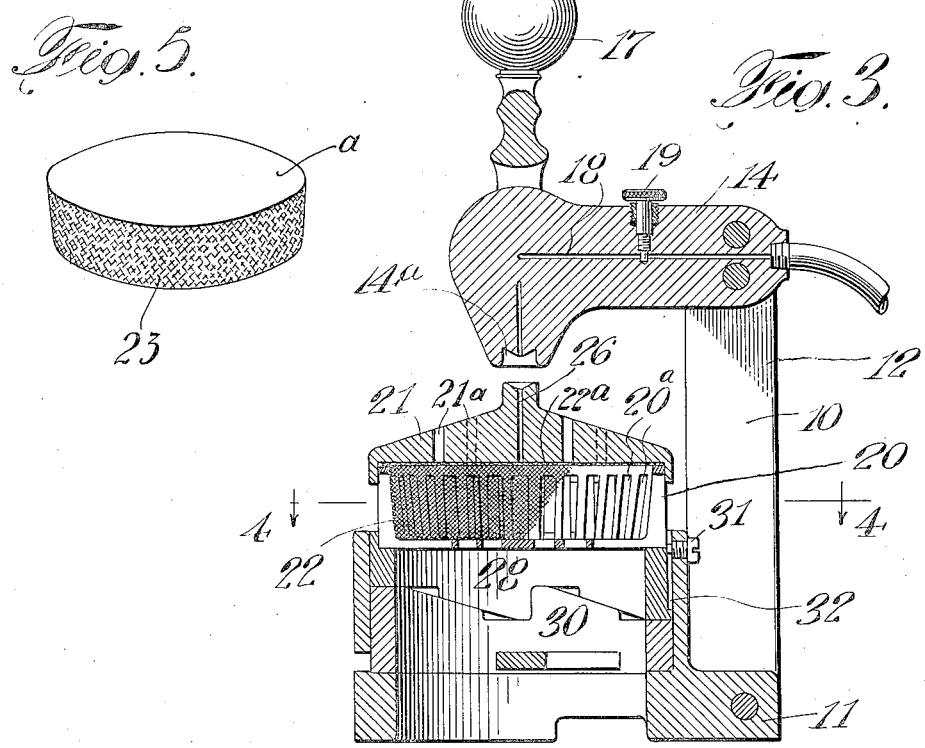
INVENTOR.
Samuel Gordon
BY Townsend & Decker
ATTORNEYS Patented Mar. 31, 1931

1,798,254

UNITED STATES PATENT OFFICE

SAMUEL GORDON, OF FAR ROCKAWAY, NEW YORK, ASSIGNOR TO INTERNATIONAL DRY REFRIGERATION CORPORATION, OF WILMINGTON, DELAWARE, A CORPORATION OF DELAWARE

DRY-ICE DISPENSER

Application filed May 14, 1929. Serial No. 362,897.

This invention relates to improvements in dispensers for carbon dioxide snow.

It is a primary object of the invention to provide a removable form within which a solid body of carbon dioxide snow is formed such that the same can be readily filled and removed from the apparatus.

It is a more specific object to facilitate the handling of the form and block of snow by forming the form of non-conducting material and producing the snow in a removable lining.

The above and other objects will appear more fully from the following description when considered in connection with the drawings, in which:

Fig. 1 is an elevational view of the apparatus.

Fig. 2 is a transverse sectional view taken substantially on the line 2—2 of Fig. 1.

Fig. 3 is a vertical sectional view taken substantially on the line 3—3 of Fig. 1.

Fig. 4 is a transverse sectional view taken on the line 4—4 of Fig. 3.

Fig. 5 is a perspective view of the solidified cake of refrigerant produced in the apparatus.

In carrying out my invention I provide a supporting frame 10 formed with a base 11 and uprights 12 formed from angle iron and supporting the head 14.

The head 14 includes a main control valve 16 having a control lever 17 for permitting or preventing the passage of the refrigerant through the restricted inlet passage 18. As shown the separated portions of the passage 18 are placed in communication through the angular duct shown on the valve disk 16 only when the lever 17 is moved to its down or operated position, this being a usual dispensing valve. A regulable valve 19 may be employed to close the inlet passage completely. The source of supply such for example as a tube of compressed liquefied $CO_2$ gas is connected to the passage 18 by any suitable devices.

The form for receiving the expanding refrigerating liquid is preferably formed of non-metallic material such for example as wood, hard rubber, refractory material, or the like, having relatively poor heat conducting qualities. As shown this form includes a reticulated body member 20 and a closure 21 therefor. The member 20 may be of any desired shape depending upon the desired use of the product. The body member 20 is formed with openings as 20a completely encircling the bottom and side walls of the form. The cap or closure member 21 has a plurality of circularly arranged rows of openings 21a extending vertically through the same to permit the escape of the last of the vapors during the filling of the form.

The interior of the member 20 and the bottom of the cap 21 are lined with a strong porous material such for example as wire gauze as indicated at 22 and 22a which may be of sufficiently fine mesh to prevent the $CO_2$ snow from escaping from the form and to cause a certain pressure within the form during the expansion of the gases. However it is preferred to form the block of snow $a$ in a removable cup formed of canvas, paper, muslin or the like and to have the cup removable with the block of refrigerant from the form as indicated at 23 in Fig. 5. Under some conditions of use the block of snow will be used with the porous interliner 23 retained entirely around the block. It would then be desirable to extend the member 23 across the upper portion of the form as to cause the porous member to completely envelop the block of snow except for the introduction opening. This construction is within the contemplation of my invention.

The members 20 and 21 are normally held in closed or assembled relation by means of the bayonet joints 24. The assembled condition of the form is also made certain by the thrust upon one of these members when the parts of the apparatus are moved to operative position. An inlet passage 26 passes downwardly through a projecting lug formed on the head 21, said lug being constructed to be received within the recess 14a of the head 14 when the parts are in their operative position, the recess 14a and cooperating projection on the member 21 constituting coacting valve seating members. In this position the inlet passage 26 corresponds with the continuation of the inlet passage 18 formed in the head 14 thus completing the inlet passage.

The form members 20 and 21 are moved upwardly into their operative positions by means of cooperating cam members 28 and 30. The member 28 is provided with a seat to receive and directly support the form member 20 and is held against rotation during its vertical movement by means of the bolt 31 engaged in a vertical slot 32 in the cam member 28. The lower or operating cam member 30 includes an operating handle 34 rigidly supported thereon and extended outwardly through the circular opening formed in the base member 11. The movement of the handle 34 through an angle of substantially 60 degrees elevates the cam member 28 and form 20, 21 into position to close the inlet passage from the head 14 to the interior of the form and to retain these elements in their assembled position during the introduction of the refrigerant.

In the use of the apparatus the entire form 20, 21 may be removed from the supporting cam member 28 and the porous, flexible cup 23 placed within the form. Thereafter the members 20 and 21 are assembled to retain the porous member 23 in place and the entire form including the interliner is placed upon the upper cam member. The movement of the handle 34 then moves the form upwardly into its operative position. Thereafter by means of the control lever 17 the desired amount of compressed, liquefied refrigerant is introduced into the form to provide the solid cake of carbon dioxide snow illustrated in Fig. 5.

Having now described my invention, I claim:

1. In a dispensing apparatus, a supporting frame, a reticulated form comprising a plurality of separable members supported on said frame, shiftable means on said frame for moving said form to its operative position and means for introducing a compressed liquefied refrigerant into said form when so moved.

2. In a dispensing apparatus, a supporting frame, a reticulated form comprising a plurality of separable members supported on said frame, means for retaining said members in assembled relation, shiftable means on said frame for moving said form to its operative position and means for introducing a compressed liquefied refrigerant into said form when so moved.

3. In a dispensing apparatus, a supporting frame, a reticulated form comprising a plurality of separable members supported on said frame, a porous lining for said frame, shiftable means on said frame for moving said form to its operative position and means for introducing a compressed liquefied refrigerant into said form when so moved.

4. In a dispensing apparatus, a reticulated form composed of rigid separable non-metallic members, a porous lining for said form and means for introducing a compressed liquefied refrigerant into said form.

5. In a dispensing apparatus, a reticulated form composed of separable non-metallic members, a porous lining for said form, a valve head, said form and head including co-acting valve seating members, means for moving said valve seating members into cooperative closed relation and means for introducing a compressed liquefied refrigerant through said head and into said form.

6. In a dispensing apparatus for carbon dioxide snow, a form composed of materials having relatively low heat conducting capacity, means on said form permitting the escape of vapors therefrom, means for introducing liquefied compressed carbon dioxide gas into said form and a removable porous interliner for said form.

7. In a dispensing apparatus, a supporting frame, a reticulated form supported on said frame, a relatively strong permanent porous lining for said form, shiftable means on said frame for moving said form to its operative position and means for introducing a compressed liquefied refrigerant into said form and lining.

8. In a dispensing apparatus, a supporting frame, a reticulated form supported on said frame, a metal gauze porous lining for said form, shiftable means on said frame for moving said form to its operative position and means for introducing a compressed liquefied refrigerant into said form.

Signed at New York, in the county of New York and State of New York, this 13th day of May A. D. 1929.

SAMUEL GORDON.